United States Patent
Cheng et al.

(10) Patent No.: US 11,401,698 B2
(45) Date of Patent: Aug. 2, 2022

(54) METHOD AND APPARATUS FOR CONTROLLING EXCAVATOR

(71) Applicant: BEIJING BAIDU NETCOM SCIENCE AND TECHNOLOGY CO., LTD., Beijing (CN)

(72) Inventors: Xinjing Cheng, Beijing (CN); Ruigang Yang, Beijing (CN); Yajue Yang, Beijing (CN); Feixiang Lu, Beijing (CN); Hao Xu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 276 days.

(21) Appl. No.: 16/674,989

(22) Filed: Nov. 5, 2019

(65) Prior Publication Data

US 2020/0240116 A1 Jul. 30, 2020

(30) Foreign Application Priority Data

Jan. 25, 2019 (CN) .......................... 201910075200.6

(51) Int. Cl.
*E02F 9/26* (2006.01)
*E02F 3/43* (2006.01)
(Continued)

(52) U.S. Cl.
CPC .............. *E02F 9/262* (2013.01); *E02F 3/141* (2013.01); *E02F 3/434* (2013.01); *E02F 9/2045* (2013.01);
(Continued)

(58) Field of Classification Search
CPC . E02F 3/141; E02F 3/434; E02F 3/437; E02F 3/439; E02F 9/2045; E02F 9/205;
(Continued)

(56) References Cited

U.S. PATENT DOCUMENTS

| 9,809,956 B1 | 11/2017 | Sherlock | |
|---|---|---|---|
| 2001/0027366 A1* | 10/2001 | Ikari | ....................... E02F 3/432 |
| | | | 701/50 |

(Continued)

FOREIGN PATENT DOCUMENTS

| CN | 102041824 A | 5/2011 |
|---|---|---|
| CN | 102947513 A | 2/2013 |

(Continued)

OTHER PUBLICATIONS

Japanese Notice of Allowance for Japanese Application No. 2019-202452, dated Nov. 8, 2021, 3 pages.
(Continued)

*Primary Examiner* — Tyler J Lee
(74) *Attorney, Agent, or Firm* — Seed IP Law Group LLP

(57) ABSTRACT

A method and an apparatus for controlling an excavator are provided according to the embodiments. The method includes: determining, according to preset value ranges of trajectory parameters in at least two trajectory parameters, trajectory parameter value combinations, to obtain a first trajectory parameter value combination set; determining, from the first trajectory parameter value combination set, trajectory parameter value combinations for moving from a preset starting position to a preset end position, to obtain a second trajectory parameter value combination set; determining, in the second trajectory parameter value combination set, a trajectory parameter value combination that satisfies a preset excavation condition, to obtain a third trajectory parameter value combination set; determining a target excavation trajectory from the third trajectory parameter value combination set; and sending a control instruction to the excavator to enable the excavator to excavate material according to the target excavation trajectory.

11 Claims, 6 Drawing Sheets

(51) Int. Cl.
   *G05D 1/02*    (2020.01)
   *E02F 9/20*    (2006.01)
   *E02F 3/14*    (2006.01)
(52) U.S. Cl.
   CPC ............ *E02F 9/265* (2013.01); *G05D 1/0219* (2013.01); *G05D 1/0238* (2013.01); *G05D 2201/0202* (2013.01)
(58) Field of Classification Search
   CPC ........ E02F 9/262; E02F 9/265; G05D 1/0219; G05D 1/0238; G05D 2201/0202
   See application file for complete search history.

(56) References Cited

U.S. PATENT DOCUMENTS

| | | | | |
|---|---|---|---|---|
| 2018/0355587 | A1* | 12/2018 | Hashimoto | G05D 1/0212 |
| 2019/0186100 | A1* | 6/2019 | Yamanaka | E02F 3/43 |
| 2019/0218745 | A1* | 7/2019 | Hashimoto | E02F 3/815 |
| 2019/0218747 | A1* | 7/2019 | Hashimoto | E02F 3/84 |
| 2020/0370277 | A1* | 11/2020 | Takaoka | E02F 9/2041 |

FOREIGN PATENT DOCUMENTS

| | | |
|---|---|---|
| EP | 2 204 503 A2 | 7/2010 |
| JP | 62-160325 A | 7/1987 |
| JP | 5-311692 A | 11/1993 |
| JP | 6-280282 A | 10/1994 |
| JP | 2001-323517 A | 11/2001 |
| JP | 2016-160718 A | 9/2016 |
| JP | 2016-186210 A | 10/2016 |
| JP | 2018-168584 A | 11/2018 |
| KR | 10-2015-0114017 A | 10/2015 |
| WO | 2018/051511 A1 | 3/2018 |

OTHER PUBLICATIONS

Korean Notice of Allowance for Korean Application No. 9-5-2022-007046816, dated Jan. 25, 2022, 2 pages.

* cited by examiner

METHOD AND APPARATUS FOR CONTROLLING EXCAVATOR

CROSS-REFERENCE TO RELATED APPLICATIONS

This application claims priority to Chinese Patent Application No. 201910075200.6, filed on Jan. 25, 2019, titled "Method and Apparatus for Controlling Excavator," which is hereby incorporated by reference in its entirety.

TECHNICAL FIELD

Embodiments of the present disclosure relate to the field of mechanical control technologies, and specifically to a method and apparatus for controlling an excavator.

BACKGROUND

Operating an excavator is complicated, and different operators have different operating skills and operating habits, resulting in the operations of the excavator not meeting a uniform standard. Therefore, autonomous excavators gradually draw people's attention. How to determine an excavation trajectory for an autonomous excavator is currently a widely studied issue in the field of autonomous excavator control.

SUMMARY

A method and an apparatus for controlling an excavator are provided according to the embodiments of the disclosure In an aspect, a method for controlling an excavator is provided according to some embodiments of the disclosure. The method includes: determining, according to preset value ranges of trajectory parameters in at least two trajectory parameters, a plurality of trajectory parameter value combinations, to obtain a first trajectory parameter value combination set, the trajectory parameter value combination including a parameter value of the trajectory parameter in the at least two trajectory parameters; determining, from the first trajectory parameter value combination set, a plurality of trajectory parameter value combinations for moving from a preset starting position to a preset end position, to obtain a second trajectory parameter value combination set; determining, in the second trajectory parameter value combination set, a trajectory parameter value combination that satisfies a preset excavation condition, to obtain a third trajectory parameter value combination set; determining a target excavation trajectory from the third trajectory parameter value combination set; and sending a control instruction to the excavator to enable the excavator to excavate material according to the target excavation trajectory.

In some embodiments, the determining, according to preset value ranges of trajectory parameters in at least two trajectory parameters, a plurality of trajectory parameter value combinations, to obtain a first trajectory parameter value combination set, includes: determining, for the trajectory parameter in the at least two trajectory parameters, at least two trajectory parameter values of the trajectory parameter according to the preset value range of the trajectory parameter; and combining trajectory parameter values of the at least two trajectory parameters respectively to obtain the first trajectory parameter value combination set.

In some embodiments, the determining, from the first trajectory parameter value combination set, a plurality of trajectory parameter value combinations for moving from a preset starting position to a preset end position, includes: determining a first horizontal distance and a first vertical distance between the starting position and the end position; determining, for the trajectory parameter value combination in the first trajectory parameter value combination set, a second horizontal distance and a second vertical distance of an excavation trajectory indicated by the trajectory parameter value combination; and determining, in response to determining that the first horizontal distance is same as the second horizontal distance and the first vertical distance is same as the second vertical distance, the trajectory parameter value combination for moving from the starting position to the end position.

In some embodiments, the determining, in the second trajectory parameter value combination set, a trajectory parameter value combination that satisfies a preset excavation condition, to obtain a third trajectory parameter value combination set, includes: determining, for the trajectory parameter value combination in the second trajectory parameter value combination set, whether the trajectory parameter value combination satisfies the preset excavation condition as follows: when an excavation trajectory indicated by the trajectory parameter value combination is executed, no obstacle is collided, and an excavation power is greater than excavation resistance; and adding, in response to determining that the trajectory parameter value combination satisfies the above condition, the trajectory parameter value combination to the third trajectory parameter value combination set.

In some embodiments, the determining a target excavation trajectory from the third trajectory parameter value combination set, includes: determining excavation volumes corresponding to trajectory parameter value combinations in the third trajectory parameter value combination set, to obtain an excavation volume set; and determining the target excavation trajectory based on the excavation volume set.

In some embodiments, the determining the target excavation trajectory based on the excavation volume set, includes: determining at least one excavation volume that is less than a bucket capacity in the excavation volume set; determining, a trajectory parameter value combination corresponding to a maximum excavation volume in the at least one excavation volume, as a target trajectory parameter value combination; and determining an excavation trajectory indicated by the target trajectory parameter value combination as the target excavation trajectory.

In a second aspect, an apparatus for controlling an excavator is provided. The apparatus includes: a first set determining unit, configured to determine, according to preset value ranges of trajectory parameters in at least two trajectory parameters, a plurality of trajectory parameter value combinations, to obtain a first trajectory parameter value combination set, the trajectory parameter value combination including a parameter value of the trajectory parameter in the at least two trajectory parameters; a second set determining unit, configured to determine, from the first trajectory parameter value combination set, a plurality of trajectory parameter value combinations for moving from a preset starting position to a preset end position, to obtain a second trajectory parameter value combination set; a third set determining unit, configured to determine, in the second trajectory parameter value combination set, a trajectory parameter value combination that satisfies a preset excavation condition, to obtain a third trajectory parameter value combination set; a target determining unit, configured to determine a target excavation trajectory from the third trajectory parameter value combination set; and an instruction sending unit, configured to send a control instruction to the excavator to enable the excavator to excavate material according to the target excavation trajectory.

In some embodiments, the first set determining unit is further configured to: determine, for the trajectory parameter in the at least two trajectory parameters, at least two trajectory parameter values of the trajectory parameter according to the preset value range of the trajectory parameter; and combine trajectory parameter values of the at least two trajectory parameters respectively to obtain the first trajectory parameter value combination set.

In some embodiments, the second set determining unit is further configured to: determine a first horizontal distance and a first vertical distance between the starting position and the end position; determine, for the trajectory parameter value combination in the first trajectory parameter value combination set, a second horizontal distance and a second vertical distance of an excavation trajectory indicated by the trajectory parameter value combination; and determine, in response to determining that the first horizontal distance is same as the second horizontal distance and the first vertical distance is same as the second vertical distance, the trajectory parameter value combination for moving from the starting position to the end position.

In some embodiments, the third set determining unit is further configured to: determine, for the trajectory parameter value combination in the second trajectory parameter value combination set, whether the trajectory parameter value combination satisfies the preset excavation condition as follows: when an excavation trajectory indicated by the trajectory parameter value combination is executed, no obstacle is collided, and an excavation power is greater than excavation resistance; and add, in response to determining that the trajectory parameter value combination satisfies the above condition, the trajectory parameter value combination to the third trajectory parameter value combination set.

In some embodiments, the target determining unit includes: a volume determining module, configured to determine excavation volumes corresponding to trajectory parameter value combinations in the third trajectory parameter value combination set, to obtain an excavation volume set; and a target determining module, configured to determine the target excavation trajectory based on the excavation volume set.

In some embodiments, the target determining module is further configured to: determine at least one excavation volume that is less than a bucket capacity in the excavation volume set; determine, a trajectory parameter value combination corresponding to a maximum excavation volume in the at least one excavation volume, as a target trajectory parameter value combination; and determine an excavation trajectory indicated by the target trajectory parameter value combination as the target excavation trajectory.

In a third aspect, an electronic device is provided according to some embodiments of the disclosure. The electronic device includes one or more processors; and a storage apparatus, storing one or more programs thereon, the one or more programs, when executed by the one or more processors, cause the one or more processors to implement the method according to any embodiment of the first aspect.

In a fourth aspect, a computer readable medium is provided according to some embodiments of the disclosure. The computer readable medium stores a computer program thereon, and the program, when executed by a processor, implements the method according to any embodiment of the first aspect.

According to the method and the apparatus for controlling an excavator provided by the above embodiment of the present disclosure, first according to preset value ranges of trajectory parameters in at least two trajectory parameters, a plurality of trajectory parameter value combinations may be determined, to obtain a first trajectory parameter value combination set. Then a plurality of trajectory parameter value combinations for moving the excavator from a preset starting position to a preset end position is determined from the first trajectory parameter value combination set to obtain a second trajectory parameter value combination set. Then in the second trajectory parameter value combination set, a trajectory parameter value combination that satisfies a preset excavation condition is determined, to obtain a third trajectory parameter value combination set. A target excavation trajectory is determined from the third trajectory parameter value combination set, and finally the excavator is controlled to excavate material according to the target excavation trajectory. The method of the present embodiment may determine the best excavation trajectory for the excavator, thereby improving an excavation efficiency of the excavator.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
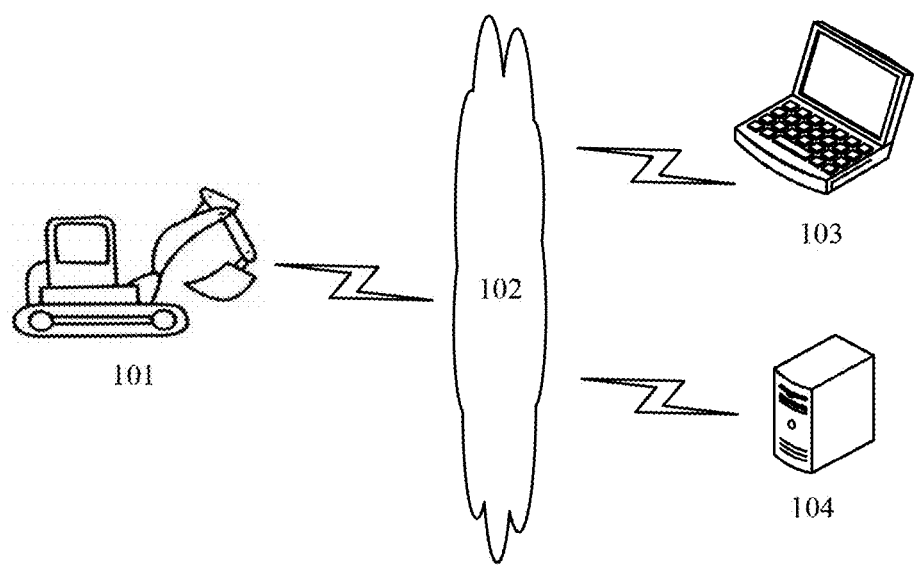
FIG. 1 is a diagram of an example system architecture in which some embodiments of the present disclosure may be implemented.

FIG. 1 illustrates an example system architecture 100 of a method for controlling an excavator or an apparatus for controlling an excavator in which some embodiments of the present disclosure may be implemented.

As shown in FIG. 1, the system architecture 100 may include an excavator 101, a network 102, a terminal device 103, and a server 104. The network 102 is used to provide a communication link medium between the excavator 101, the terminal device 103 and the server 104. The network 102 may include various types of connections, such as wired, wireless communication links, or optic fibers.

The excavator 101 may be used to perform an excavation task. Specifically, the excavator 101 may include a bucket, and the excavator 101 may perform the excavation task by controlling the position of the bucket. The excavator 101 may be an autonomous excavator or an intelligent excavator, and the excavation task may be automatically performed in accordance with a control instruction.

The excavator 101 may interact with the terminal device 103 or the server 104 via the network 102 to receive or send messages and the like. For example, the terminal device 103 may be configured to determine a target excavation trajectory and then send a control instruction to the excavator 101. The terminal device 103 may be installed with various communication client applications, such as a simulation computing application, a web browser application, a shopping application, a search application, an instant communication tool, a mailbox client, or a social platform software.

The terminal device 103 may be hardware or software. When the terminal device 103 is hardware, the terminal device 103 may be various electronic devices including, but not limited to, a smartphone, a tablet, a laptop portable computer, a desktop computer, and the like. When the terminal device 103 is software, the terminal device 103 may be installed in the above-listed electronic devices. The terminal device 103 may be implemented as a plurality of pieces of software or software modules (for example, for providing distributed services), or as a single piece of software or software module, which is not specifically limited herein.

The server 104 may be a server that provides various services. For example, a backend server that provides support for excavation tasks performed by the excavator 101. The backend server may process data of the excavator 101 and feed back a processing result (e.g., control instruction) to the excavator 101.

It should be noted that the server 104 may be hardware or software. When the server 104 is hardware, the server 104 may be implemented as a distributed server cluster composed of a plurality of servers, or may be implemented as a single server. When the server 104 is software, the server 104 may be implemented as a plurality of pieces of software or software modules (for example, for providing distributed services), or as a single piece of software or software module, which is not specifically limited herein.

It should be noted that the method for controlling an excavator provided by the embodiments of the present disclosure may be performed by the terminal device 103, or may be performed by the server 104. Accordingly, the apparatus for controlling an excavator may be disposed in the terminal device 103, or may be disposed in the server 104.

It should be understood that the number of excavators, terminal devices, networks and servers in FIG. 1 is merely illustrative. Depending on the implementation needs, there may be any number of excavators, terminal devices, networks and servers.

Figure 2:
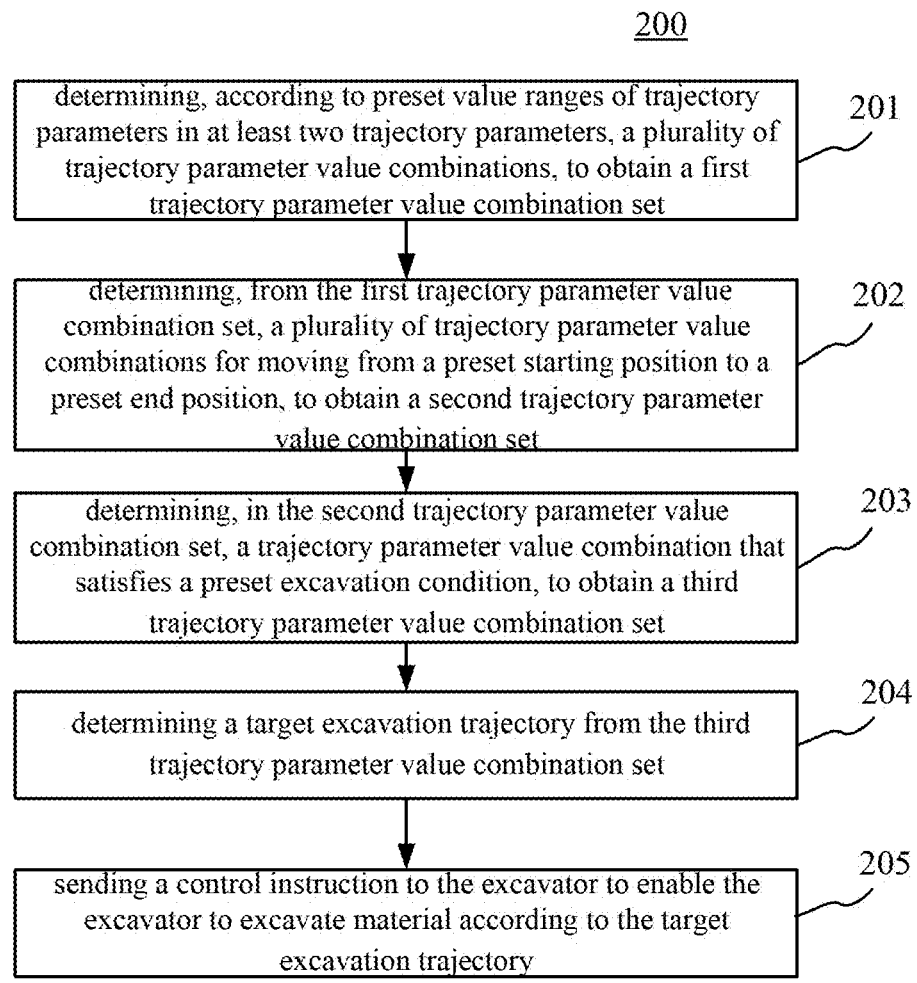
FIG. 2 is a flowchart of a method for controlling an excavator according to some embodiments of the present disclosure.

With further reference to FIG. 2, a flow 200 of a method for controlling an excavator according to some embodiments of the present disclosure is illustrated. The method for controlling an excavator of the present embodiment includes the following steps 201 to 205.

Step 201 includes determining, according to preset value ranges of trajectory parameters in at least two trajectory parameters, a plurality of trajectory parameter value combinations, to obtain a first trajectory parameter value combination set.

Figure 2A:
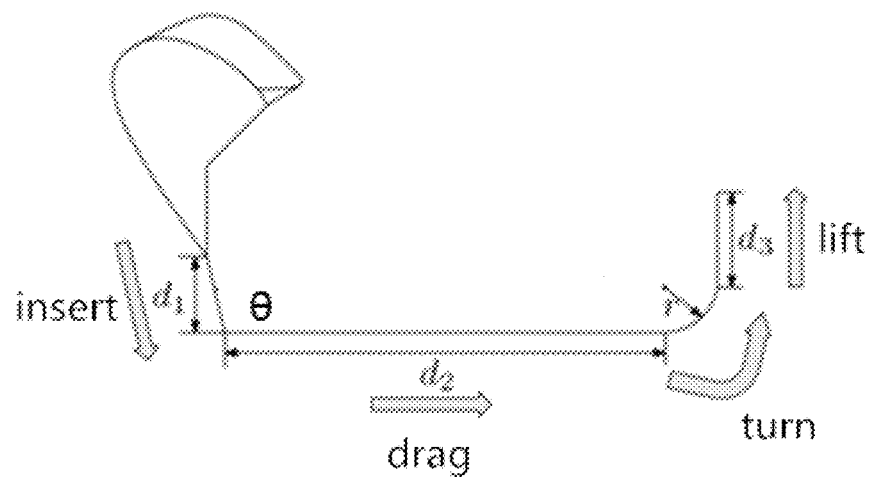
FIG. 2a is a schematic diagram of an excavation trajectory in the method for controlling an excavator according to some embodiments of the present disclosure.

In the present embodiment, an executing body of the method for controlling an excavator (for example, the terminal device 103 or the server 104 shown in FIG. 1) may obtain a plurality of trajectory parameter value combinations according to a preset value range of each of the at least two trajectory parameters. Here, the trajectory parameter is a parameter for describing an excavation trajectory. The excavation trajectory may be a passing trajectory of the teeth of the bucket of the excavator. As shown in FIG. 2a, the excavation trajectory may include four parts: "insert", "drag", "turn", and "lift". Here, "insert" refers to a trajectory that the bucket inserts into the interior of an excavation object. "Drag" refers to a trajectory that the bucket drags in the excavation object. "Turn" refers to a trajectory that the bucket carrying material turns. "Lift" refers to a trajectory that the bucket lifts the material from the interior of the excavation object. Trajectory parameters of the "insert" part may include a height $d_1$ and a tilt angle $\theta$. Trajectory parameters of the "drag" part may include a distance $d_2$. Trajectory parameters of the "turn" part may include a radius $r$ of curvature. Trajectory parameters of the "lift" part may include a height $d_3$. Each trajectory parameter has a preset value range that is related to the hardware structure of the excavator.

The executing body may determine a plurality of trajectory parameter values from the plurality of value ranges. For example, the executing body may first determine the trajectory parameter value of one or more trajectory parameters according to the material to be excavated and the preset value ranges of the trajectory parameters. Then, a plurality of trajectory parameter values of other trajectory parameters are determined. Finally, the trajectory parameter values of the trajectory parameters are combined to obtain a trajectory parameter value combination. Here, one trajectory parameter value of each trajectory parameter is included in the trajectory parameter value combination. In this way, a set of trajectory parameter value combinations may be obtained, which is recorded as the first trajectory parameter value combination set.

In some alternative implementations of the present embodiment, the executing body may determine at least two trajectory parameter values of each trajectory parameter according to the preset value range of each trajectory parameter. Then, one trajectory parameter value of each trajectory parameter is sequentially combined to obtain the first trajectory parameter value combination set.

Step 202 includes determining, from the first trajectory parameter value combination set, a plurality of trajectory parameter value combinations for moving from a preset starting position to a preset end position, to obtain a second trajectory parameter value combination set.

After determining the first trajectory parameter value combination set, the executing body may determine therefrom a plurality of trajectory parameter value combinations with which the bucket can move from the preset starting position to the preset end position, to obtain the second trajectory parameter value combination set. In the present embodiment, the starting position and the end position of an excavation task are both preset. Therefore, the determined excavation trajectory should pass the starting position and the end position. The executing body may determine in various ways whether the trajectory parameter value combinations can enable the bucket to move from the starting position to the end position. For example, the executing body may first use the starting position as the starting point of one of the trajectory parameters, and sequentially calculate the end positions corresponding to the trajectory parameters. Then, whether the end point of the last part coincides with the preset end position is determined. If the end positions are coincided, it is indicated that the excavation trajectory indicated by the trajectory parameter value combination may pass the starting position and the end position.

In some alternative implementations of the present embodiment, the above step 202 may be specifically implemented by the following steps not shown in FIG. 2: determining a first horizontal distance and a first vertical distance between the starting position and the end position. For a trajectory parameter value combination in the first trajectory parameter value combination set, a second horizontal distance and a second vertical distance of an excavation trajectory indicated by the trajectory parameter value combination are determined. In response to determining that the first horizontal distance is the same as the second horizontal distance and the first vertical distance is the same as the second vertical distance, it is determined that the trajectory parameter value combination is for moving from the starting position to the end position.

In this implementation, the executing body may first calculate the first horizontal distance and the first vertical distance between the preset starting position and the preset end position. The first horizontal distance and the first vertical distance may be calculated from the coordinates of the starting position and the coordinates of the end position. Then, for each trajectory parameter value combination in the first trajectory parameter value combination set, the executing body may calculate the second horizontal distance and the second vertical distance of the excavation trajectory indicated by the trajectory parameter value combination. It may be understood that the second horizontal distance and the second vertical distance may be calculated from the trajectory parameter values. Taking an excavation trajectory shown in FIG. 2a as an example, the second horizontal distance is equal to $d_1/\tan\theta + d_2 + r$. Finally, if the executing body determines that the first horizontal distance is the same as the second horizontal distance and the first vertical distance is the same as the second vertical distance, then the trajectory parameter value combination is considered to be available for moving from the starting position to the end position. Then, the trajectory parameter value combination may be added to the second trajectory parameter value combination set.

Step 203 includes determining, in the second trajectory parameter value combination set, a trajectory parameter value combination that satisfies a preset excavation condition, to obtain a third trajectory parameter value combination set.

After obtaining the second trajectory parameter value combination set, the executing body may sequentially determine whether each trajectory parameter value combination satisfies the preset excavation condition, and add the trajectory parameter value combination satisfying the excavation condition to the third trajectory parameter value combination set. The above excavation condition may be set by those skilled in the art according to actual conditions in an application scenario. For example, the excavation condition may include: the second horizontal distance corresponding to the trajectory parameter value combination does not exceed the maximum excavation radius, the second vertical distance corresponding to the trajectory parameter value combination does not exceed the maximum excavation depth, and the like.

In some alternative implementations of the present embodiment, the excavation condition may include: when an excavation trajectory indicated by the trajectory parameter value combination is executed, no obstacle is collided, and an excavation power is greater than excavation resistance. The above step 203 may be specifically implemented by the following steps not shown in FIG. 2: determining, for a trajectory parameter value combination in the second trajectory parameter value combination set, whether the trajectory parameter value combination satisfies the preset excavation condition as follows: when an excavation trajectory indicated by the trajectory parameter value combination is executed, no obstacle is collided, and an excavation power is greater than excavation resistance. In response to determining that the trajectory parameter value combination satisfies the above condition, the trajectory parameter value combination is added to the third trajectory parameter value combination set.

In this implementation, for each trajectory parameter value combination in the second trajectory parameter value combination set, the executing body may determine whether the trajectory parameter value combination satisfies the preset excavation condition as follows: when the excavation trajectory indicated by the trajectory parameter value combination is executed, no obstacle is collided, and the excavation power is greater than the excavation resistance. If the above excavation conditions are satisfied at the same time, the trajectory parameter value combination is added to the third trajectory parameter value combination set.

For the first excavation condition, the location of the obstacle is known. The executing body may combine the structural parameters of the excavator to determine a sequence of positions passed by the components of the excavator when the components of the excavator execute the excavation trajectory indicated by the trajectory parameter value combination, and determine whether the location of the obstacle coincides with one or more positions in the sequence of positions. If the executing body determines that the location of the obstacle coincides with one or more positions in the sequence of positions, it is determined that the obstacle is collided when the excavation trajectory indicated by the trajectory parameter value combination is executed.

For the second excavation condition, the executing body may determine the excavation resistance of the excavator when the excavator excavates the material based on parameters such as density, hardness of the material to be excavated, and the trajectory parameter value combination. The excavation power is an existing parameter of the excavator, and the executing body may determine whether the excavation power is greater than the above excavation resistance based on the excavation power.

Step 204 includes determining a target excavation trajectory from the third trajectory parameter value combination set.

After determining the third trajectory parameter value combination set, the executing body may determine the target excavation trajectory from the third trajectory parameter value combination set. In the present embodiment, the target excavation trajectory may be an excavation trajectory indicated by any trajectory parameter value combination in the third trajectory parameter value combination set, or may be an excavation trajectory indicated by a trajectory parameter value combination having the least excavation resistance.

Step 205 includes sending a control instruction to the excavator to enable the excavator to excavate material according to the target excavation trajectory.

After determining the target excavation trajectory, the executing body may send the control instruction to the excavator to enable the excavator to excavate the material according to the target excavation trajectory. Specifically, the control instruction may include parameters such as a trajectory parameter value combination corresponding to the target excavation trajectory, and a starting position. After receiving the control instruction, the excavator may control the various parts of the excavator based on the parameters included in the control instruction to excavate the material.

Figure 3:
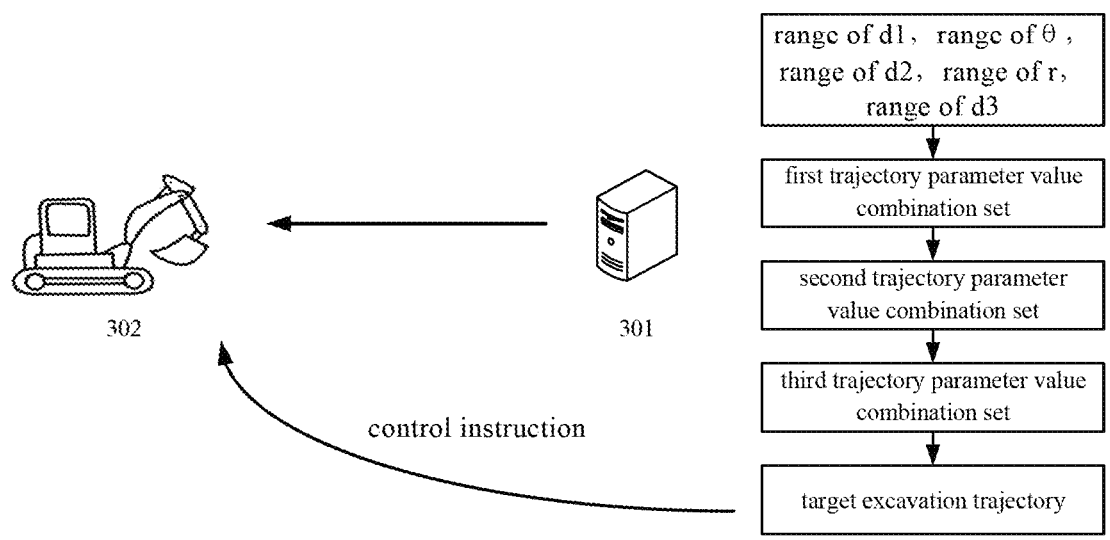
FIG. 3 is a schematic diagram of an application scenario of the method for controlling an excavator according to some embodiments of the present disclosure.

With further reference to FIG. 3, FIG. 3 is a schematic diagram of an application scenario of the method for controlling an excavator according to some embodiments of the present embodiment. In the application scenario of FIG. 3, a server 301 determines a plurality of trajectory parameter value combinations according to the value range of each of five trajectory parameters to obtain a first trajectory parameter value combination set. Then, a plurality of trajectory parameter value combinations that can move the excavator from the starting position to the end position are selected from the first trajectory parameter value combination set to obtain a second trajectory parameter value combination set. Then, a plurality of trajectory parameter value combinations satisfying a preset excavation condition are selected from the second trajectory parameter value combination set to obtain a third trajectory parameter value combination set. Finally, a target excavation trajectory is determined from the third trajectory parameter value combination set. In addition, a control instruction is generated according to the target excavation trajectory and send to an excavator 302. The excavator 302 excavates material after receiving the control instruction.

In the method for controlling an excavator provided by the above embodiment of the present disclosure, first according to preset value ranges of trajectory parameters in at least two trajectory parameters, a plurality of trajectory parameter value combinations may be determined, to obtain a first trajectory parameter value combination set. Then a plurality of trajectory parameter value combinations for moving the excavator from a preset starting position to a preset end position is determined from the first trajectory parameter value combination set to obtain a second trajectory parameter value combination set. Then in the second trajectory parameter value combination set, a trajectory parameter value combination that satisfies a preset excavation condition is determined, to obtain a third trajectory parameter value combination set. A target excavation trajectory is determined from the third trajectory parameter value combination set, and finally the excavator is controlled to excavate material according to the target excavation trajectory. The method of the present embodiment may determine the best excavation trajectory for the excavator, thereby improving an excavation efficiency of the excavator.

Figure 4:
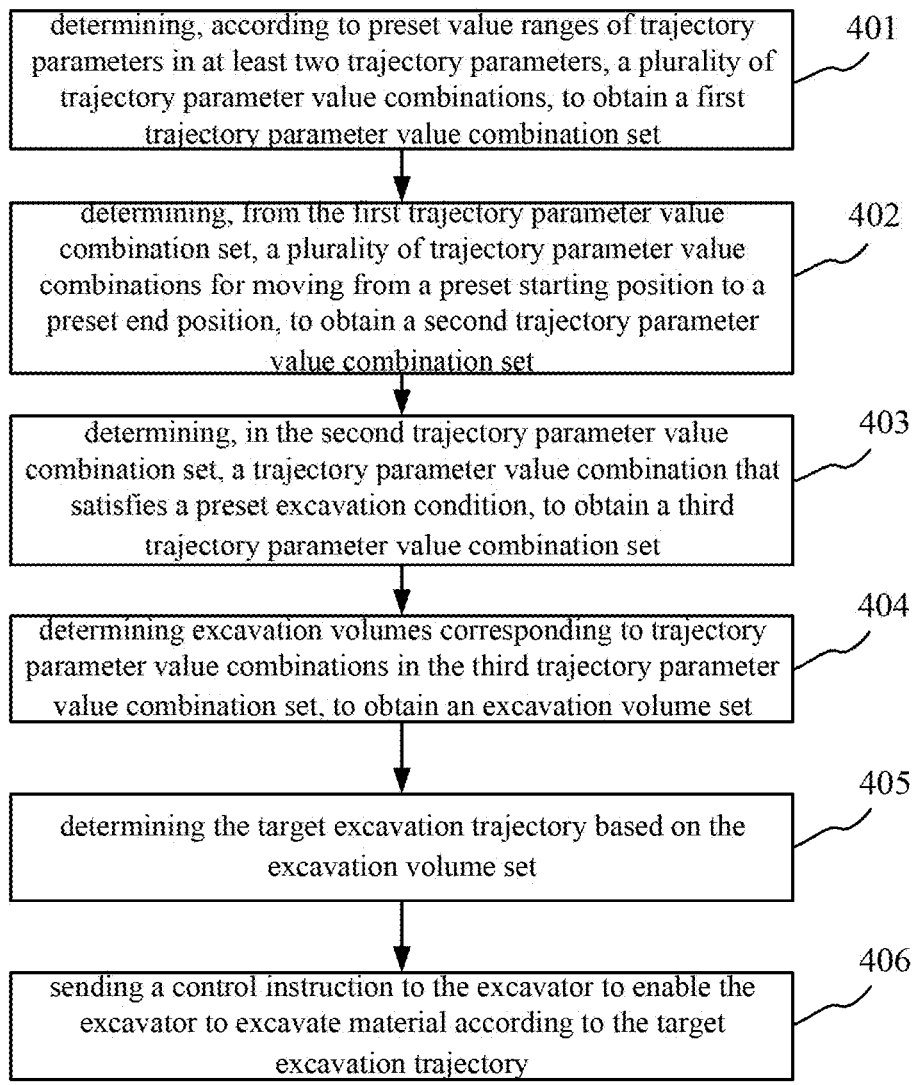
FIG. 4 is a flowchart of the method for controlling an excavator according to other embodiments of the present disclosure.

With further reference to FIG. 4, a flow 400 of the method for controlling an excavator according to other embodiments of the present disclosure is illustrated. As shown in FIG. 4, the method of the present embodiment includes the following steps 401 to 406.

Step 401 includes determining, according to preset value ranges of trajectory parameters in at least two trajectory parameters, a plurality of trajectory parameter value combinations, to obtain a first trajectory parameter value combination set.

Step 402 includes determining, from the first trajectory parameter value combination set, a plurality of trajectory parameter value combinations for moving from a preset starting position to a preset end position, to obtain a second trajectory parameter value combination set.

Step 403 includes determining, in the second trajectory parameter value combination set, a trajectory parameter value combination that satisfies a preset excavation condition, to obtain a third trajectory parameter value combination set.

The principles of steps 401 to 403 are similar to the principles of steps 201 to 203, and detailed description thereof is omitted.

Step 404 includes determining excavation volumes corresponding to trajectory parameter value combinations in the third trajectory parameter value combination set, to obtain an excavation volume set.

In the present embodiment, the executing body may calculate the excavation volume corresponding to each trajectory parameter value combination in the third trajectory parameter value combination set, and obtain the excavation volume set. Specifically, the executing body may determine the excavation volume corresponding to the trajectory parameter value combination based on the width of the bucket, the excavation depth corresponding to the trajectory parameter value combination and the excavation horizontal distance. In this way, the excavation volume corresponding to each trajectory parameter value combination may be obtained to obtain the excavation volume set.

Step 405 includes determining the target excavation trajectory based on the excavation volume set.

The executing body may determine the target excavation trajectory based on the excavation volume set. For example, the executing body may determine an excavation trajectory indicated by the trajectory parameter value combination corresponding to the maximum value of the excavation volume in the excavation volume set as the target excavation trajectory. Alternatively, the executing body may determine an excavation trajectory indicated by a trajectory parameter value combination corresponding to an excavation volume having a difference with the bucket capacity less than a preset threshold as the target excavation trajectory.

In some alternative implementations of the present embodiment, the above step 405 may be specifically implemented by the following steps not shown in FIG. 4: determining at least one excavation volume that is less than a bucket capacity in the excavation volume set; determining, a trajectory parameter value combination corresponding to a maximum excavation volume in the at least one excavation volume, as a target trajectory parameter value combination; and determining an excavation trajectory indicated by the target trajectory parameter value combination as the target excavation trajectory.

In this implementation, the executing body may determine the at least one excavation volume that is less than the bucket capacity in the excavation volume set. Then, the maximum value of the excavation volume is determined from the at least one excavation volume. The trajectory parameter value combination corresponding to the maximum value is determined as the target trajectory parameter value combination. Finally, the excavation trajectory indicated by target trajectory parameter value combination is the target excavation trajectory.

Step 406 includes sending a control instruction to the excavator to enable the excavator to excavate material according to the target excavation trajectory.

The principle of step 406 is the same as the principle of step 205, and detailed description thereof is omitted.

With the method for controlling an excavator provided by the above embodiment of the present disclosure, the target excavation trajectory of the maximum excavation volume that the bucket can accommodate can be selected, thereby improving the excavation efficiency and reducing the excavation energy consumption.

Figure 5:
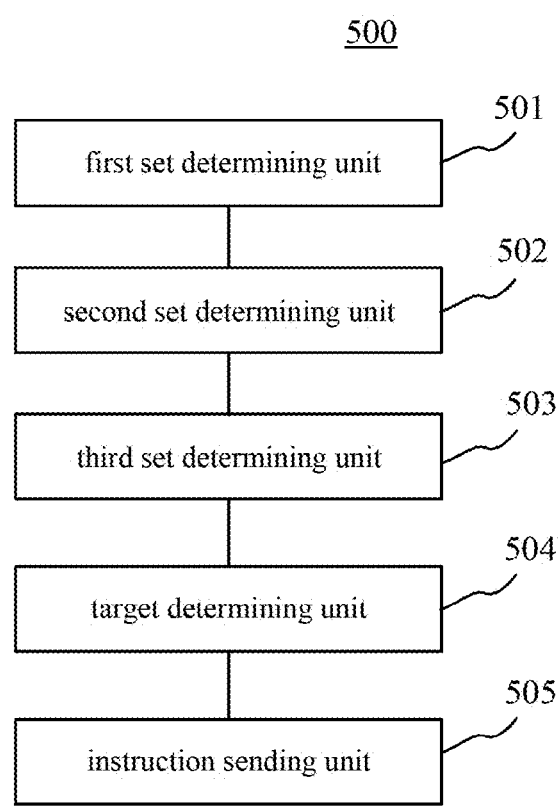
FIG. 5 is a schematic structural diagram of an apparatus for controlling an excavator according to some embodiments of the present disclosure.

With further reference to FIG. 5, as an implementation of the method shown in the above figures, the present disclosure provides an embodiment of an apparatus for controlling an excavator, and the apparatus embodiment corresponds to the method embodiment as shown in FIG. 2. The apparatus may be specifically applied to various electronic devices.

As shown in FIG. 5, an apparatus 500 for controlling an excavator of the present embodiment includes: a first set determining unit 501, a second set determining unit 502, a third set determining unit 503, a target determining unit 504 and an instruction sending unit 505.

The first set determining unit 501 is configured to determine, according to preset value ranges of trajectory parameters in at least two trajectory parameters, a plurality of trajectory parameter value combinations, to obtain a first trajectory parameter value combination set. The trajectory parameter value combination includes a parameter value of a trajectory parameter in the at least two trajectory parameters.

The second set determining unit 502 is configured to determine, from the first trajectory parameter value combination set, a plurality of trajectory parameter value combinations for moving from a preset starting position to a preset end position, to obtain a second trajectory parameter value combination set.

The third set determining unit 503 is configured to determine, in the second trajectory parameter value combination set, a trajectory parameter value combination that satisfies a preset excavation condition, to obtain a third trajectory parameter value combination set.

The target determining unit 504 is configured to determine a target excavation trajectory from the third trajectory parameter value combination set.

The instruction sending unit 505 is configured to send a control instruction to the excavator to enable the excavator to excavate material according to the target excavation trajectory.

In some alternative implementations of the present embodiment, the first set determining unit 501 may be further configured to: determine, for a trajectory parameter in the at least two trajectory parameters, at least two trajectory parameter values of the trajectory parameter according to a preset value range of the trajectory parameter; and combine trajectory parameter values of the at least two trajectory parameters respectively to obtain the first trajectory parameter value combination set.

In some alternative implementations of the present embodiment, the second set determining unit 502 is further configured to: determine a first horizontal distance and a first vertical distance between the starting position and the end position; determine, for a trajectory parameter value combination in the first trajectory parameter value combination set, a second horizontal distance and a second vertical distance of an excavation trajectory indicated by the trajectory parameter value combination; and determine, in response to determining that the first horizontal distance is the same as the second horizontal distance and the first vertical distance is the same as the second vertical distance, the trajectory parameter value combination for moving from the starting position to the end position.

In some alternative implementations of the present embodiment, the third set determining unit 503 is further configured to: determine, for a trajectory parameter value combination in the second trajectory parameter value combination set, whether the trajectory parameter value combination satisfies the preset excavation condition as follows: when an excavation trajectory indicated by the trajectory parameter value combination is executed, no obstacle is collided, and an excavation power is greater than excavation resistance; and add, in response to determining that the trajectory parameter value combination satisfies the above condition, the trajectory parameter value combination to the third trajectory parameter value combination set.

In some alternative implementations of the present embodiment, the target determining unit 504 may further include a volume determining module and a target determining module not shown in FIG. 5.

The volume determining module is configured to determine excavation volumes corresponding to trajectory parameter value combinations in the third trajectory parameter value combination set, to obtain an excavation volume set.

The target determining module is configured to determine the target excavation trajectory based on the excavation volume set.

In some alternative implementations of the present embodiment, the target determining module is further configured to: determine at least one excavation volume that is less than a bucket capacity in the excavation volume set; determine, a trajectory parameter value combination corresponding to a maximum excavation volume in the at least one excavation volume, as a target trajectory parameter value combination; and determine an excavation trajectory indicated by the target trajectory parameter value combination as the target excavation trajectory.

The apparatus for controlling an excavator provided by the above embodiment of the present disclosure, first may determine, according to preset value ranges of trajectory parameters in at least two trajectory parameters, a plurality of trajectory parameter value combinations, to obtain a first trajectory parameter value combination set, then determine, from the first trajectory parameter value combination set, a plurality of trajectory parameter value combinations for moving from a preset starting position to a preset end position, to obtain a second trajectory parameter value combination set, then determine, in the second trajectory parameter value combination set, a trajectory parameter value combination that satisfies a preset excavation condition, to obtain a third trajectory parameter value combination set, determine a target excavation trajectory from the third trajectory parameter value combination set, and finally control the excavator to excavate material according to the target excavation trajectory. The apparatus of the present embodiment may determine the best excavation trajectory for the excavator, thereby improving an excavation efficiency of the excavator.

It should be understood that the units 501-505 recited in the apparatus 500 for controlling an excavator respectively correspond to the various steps in the method described with reference to FIG. 2. Thus, the operations and features described above for the method for controlling an excavator are equally applicable to the apparatus 500 and the units contained therein, and detailed description thereof is omitted.

Figure 6:
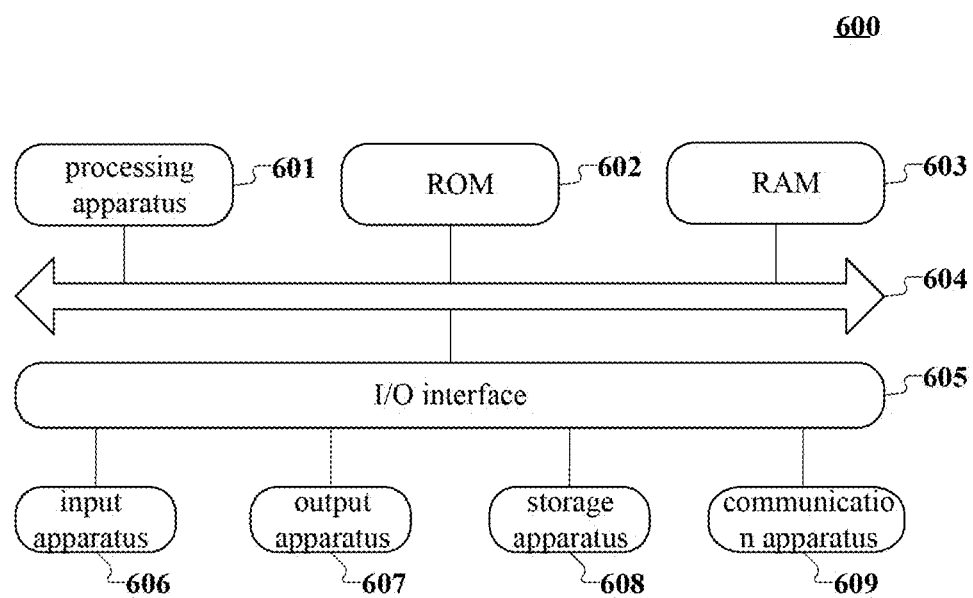
FIG. 6 is a schematic structural diagram of a computer system adapted to implement a device of the embodiments of the present disclosure.

With further reference to FIG. 6, a schematic structural diagram adapted to implement an electronic device (e.g., the server or the terminal device in FIG. 1) 600 of the embodiments of the present disclosure is illustrated. The terminal device in the embodiments of the present disclosure may include, but is not limited to, a mobile terminal such as a mobile phone, or a notebook computer, and a fixed terminal such as a digital TV, or a desktop computer. The terminal device/server shown in FIG. 6 is merely an example and should not impose any limitation on the function and scope of use of the embodiments of the present disclosure.

As shown in FIG. 6, the electronic device 600 may include a processing apparatus (e.g., a central processing unit, a graphics processor, etc.) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the electronic device 600. The processing apparatus 601, the ROM 602 and the RAM 603 are connected to each other through a bus 604. An input/output (I/O) interface 605 is also connected to the bus 604.

The following components may be connected to the I/O interface 605: an input apparatus 606 including for example a touch screen, a touch pad, a keyboard, a mouse, a camera, a microphone, an accelerometer, and a gyroscope; an output apparatus 607 including for example a liquid crystal display (LCD), a speaker, and a vibrator; a storage apparatus 608 including for example a magnetic tape, and a hard disk; and a communication apparatus 609. The communication apparatus 609 may allow the electronic device 600 to communicate with other devices to exchange data in a wired or wireless connection. Although FIG. 6 illustrates an electronic device 600 having various apparatuses, it should be understood that it is not required to implement or have all of the illustrated apparatuses. More or less apparatuses may alternatively be included or implemented. Each of the blocks shown in FIG. 6 may represent one apparatus or may represent multiple apparatuses as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication apparatus 609, or may be installed from the storage apparatus 608, or may be installed from the ROM 602. The computer program, when executed by the processing apparatus 601, implements the above mentioned functionalities as defined by the method of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the embodiments of the present disclosure, the computer readable storage medium may be any physical medium containing or storing programs which may be used by a command execution system, apparatus or element or incorporated thereto. In the embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable signal medium is capable of transmitting, propagating or transferring programs for use by, or used in combination with, a command execution system, apparatus or element. The program codes contained on the computer readable medium may be transmitted with any suitable medium including but not limited to: wired, optical cable, RF (radio frequency), etc., or any suitable combination of the above.

The computer readable medium may be included in the above electronic device, or a stand-alone computer readable medium not assembled into the electronic device. The computer readable medium carries one or more programs. The one or more programs, when executed by the electronic device, cause the electronic device to: determine, according to preset value ranges of trajectory parameters in at least two trajectory parameters, a plurality of trajectory parameter value combinations, to obtain a first trajectory parameter value combination set, the trajectory parameter value combination including a parameter value of a trajectory parameter in the at least two trajectory parameters; determine, from the first trajectory parameter value combination set, a plurality of trajectory parameter value combinations for moving from a preset starting position to a preset end position, to obtain a second trajectory parameter value combination set; determine, in the second trajectory parameter value combination set, a trajectory parameter value combination that satisfies a preset excavation condition, to obtain a third trajectory parameter value combination set; determine a target excavation trajectory from the third trajectory parameter value combination set; and send a control instruction to the excavator to enable the excavator to excavate material according to the target excavation trajectory.

A computer program code for performing operations of the embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor including a first set determining unit, a second set determining unit, a third set determining unit, a target determining unit and an instruction sending unit. Here, the names of these units do not in some cases constitute limitations to such units themselves. For example, the target determining unit may also be described as "a unit configured to determine a target excavation trajectory from the third trajectory parameter value combination set".

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the inventive concept of the present disclosure. Technical schemes formed by the above-described features being interchanged with, but not limited to, technical features with similar functions disclosed in the embodiments of the present disclosure are examples.

What is claimed is:

1. A method for controlling an excavator, the method comprising:
   determining, according to preset value ranges of trajectory parameters in at least two trajectory parameters, a plurality of trajectory parameter value combinations, to obtain a first trajectory parameter value combination set, the trajectory parameter value combination comprising a parameter value of the trajectory parameter in the at least two trajectory parameters;
   determining, from the first trajectory parameter value combination set, a plurality of trajectory parameter value combinations for moving from a preset starting position to a preset end position, to obtain a second trajectory parameter value combination set;
   determining, in the second trajectory parameter value combination set, a trajectory parameter value combination that satisfies a preset excavation condition, to obtain a third trajectory parameter value combination set;
   determining a target excavation trajectory from the third trajectory parameter value combination set, wherein the target excavation trajectory comprises an excavation trajectory indicated by a trajectory parameter value combination having a minimum excavation resistance; and
   sending a control instruction to the excavator to enable the excavator to excavate material according to the target excavation trajectory,
   wherein determining, according to preset value ranges of trajectory parameters in at least two trajectory parameters, a plurality of trajectory parameter value combinations, to obtain a first trajectory parameter value combination set, comprises:
      determining, for the trajectory parameter in the at least two trajectory parameters, at least two trajectory parameter values of the trajectory parameter according to the preset value range of the trajectory parameter; and
      combining trajectory parameter values of the at least two trajectory parameters respectively to obtain the first trajectory parameter value combination set.

2. The method according to claim 1, wherein the determining, from the first trajectory parameter value combination set, a plurality of trajectory parameter value combinations for moving from a preset starting position to a preset end position, comprises:
   determining a first horizontal distance and a first vertical distance between the starting position and the end position;
   determining, for the trajectory parameter value combination in the first trajectory parameter value combination set, a second horizontal distance and a second vertical distance of an excavation trajectory indicated by the trajectory parameter value combination; and
   determining, in response to determining that the first horizontal distance is same as the second horizontal distance and the first vertical distance is same as the second vertical distance, the trajectory parameter value combination for moving from the starting position to the end position.

3. The method according to claim 1, wherein the determining, in the second trajectory parameter value combination set, a trajectory parameter value combination that satisfies a preset excavation condition, to obtain a third trajectory parameter value combination set, comprises:
   determining, for the trajectory parameter value combination in the second trajectory parameter value combination set, whether the trajectory parameter value combination satisfies the preset excavation condition as follows: when an excavation trajectory indicated by the trajectory parameter value combination is executed, no obstacle is collided, and an excavation power is greater than excavation resistance; and
   adding, in response to determining that the trajectory parameter value combination satisfies the above condition, the trajectory parameter value combination to the third trajectory parameter value combination set.

4. The method according to claim 1, wherein the determining a target excavation trajectory from the third trajectory parameter value combination set, comprises:

determining excavation volumes corresponding to trajectory parameter value combinations in the third trajectory parameter value combination set, to obtain an excavation volume set; and determining the target excavation trajectory based on the excavation volume set.

5. The method according to claim 4, wherein the determining the target excavation trajectory based on the excavation volume set, comprises:

determining at least one excavation volume that is less than a bucket capacity in the excavation volume set;

determining, a trajectory parameter value combination corresponding to a maximum excavation volume in the at least one excavation volume, as a target trajectory parameter value combination; and determining an excavation trajectory indicated by the target trajectory parameter value combination as the target excavation trajectory.

6. An apparatus for controlling an excavator, the apparatus comprising:

at least one processor; and a memory storing instructions, wherein the instructions when executed by the at least one processor, cause the at least one processor to perform operations, the operations comprising determining, according to preset value ranges of trajectory parameters in at least two trajectory parameters, a plurality of trajectory parameter value combinations, to obtain a first trajectory parameter value combination set, the trajectory parameter value combination comprising a parameter value of the trajectory parameter in the at least two trajectory parameters;

determining, from the first trajectory parameter value combination set, a plurality of trajectory parameter value combinations for moving from a preset starting position to a preset end position, to obtain a second trajectory parameter value combination set;

determining, in the second trajectory parameter value combination set, a trajectory parameter value combination that satisfies a preset excavation condition, to obtain a third trajectory parameter value combination set;

determining a target excavation trajectory from the third trajectory parameter value combination set, wherein the target excavation trajectory comprises an excavation trajectory indicated by a trajectory parameter value combination having a minimum excavation resistance; and sending a control instruction to the excavator to enable the excavator to excavate material according to the target excavation trajectory, wherein the determining, according to preset value ranges of trajectory parameters in at least two trajectory parameters, a plurality of trajectory parameter value combinations, to obtain a first trajectory parameter value combination set, comprises:

determining, for the trajectory parameter in the at least two trajectory parameters, at least two trajectory parameter values of the trajectory parameter according to the preset value range of the trajectory parameter; and combining trajectory parameter values of the at least two trajectory parameters respectively to obtain the first trajectory parameter value combination set.

7. The apparatus according to claim 6, wherein the determining, from the first trajectory parameter value combination set, a plurality of trajectory parameter value combinations for moving from a preset starting position to a preset end position, comprises:

determining a first horizontal distance and a first vertical distance between the starting position and the end position;

determining, for the trajectory parameter value combination in the first trajectory parameter value combination set, a second horizontal distance and a second vertical distance of an excavation trajectory indicated by the trajectory parameter value combination; and determining, in response to determining that the first horizontal distance is same as the second horizontal distance and the first vertical distance is same as the second vertical distance, the trajectory parameter value combination for moving from the starting position to the end position.

8. The apparatus according to claim 6, wherein the determining, in the second trajectory parameter value combination set, a trajectory parameter value combination that satisfies a preset excavation condition, to obtain a third trajectory parameter value combination set, comprises:

determining, for the trajectory parameter value combination in the second trajectory parameter value combination set, whether the trajectory parameter value combination satisfies the preset excavation condition as follows: when an excavation trajectory indicated by the trajectory parameter value combination is executed, no obstacle is collided, and an excavation power is greater than excavation resistance; and adding, in response to determining that the trajectory parameter value combination satisfies the above condition, the trajectory parameter value combination to the third trajectory parameter value combination set.

9. The apparatus according to claim 6, wherein the determining a target excavation trajectory from the third trajectory parameter value combination set, comprises:

determining excavation volumes corresponding to trajectory parameter value combinations in the third trajectory parameter value combination set, to obtain an excavation volume set; and determining the target excavation trajectory based on the excavation volume set.

10. The apparatus according to claim 9, wherein the determining the target excavation trajectory based on the excavation volume set, comprises:

determining at least one excavation volume that is less than a bucket capacity in the excavation volume set;

determining, a trajectory parameter value combination corresponding to a maximum excavation volume in the at least one excavation volume, as a target trajectory parameter value combination; and determining an excavation trajectory indicated by the target trajectory parameter value combination as the target excavation trajectory.

11. A non-transitory computer readable medium, storing a computer program thereon, wherein the program, when executed by a processor, causes the processor to perform operations, the operations comprising:

determining, according to preset value ranges of trajectory parameters in at least two trajectory parameters, a plurality of trajectory parameter value combinations, to obtain a first trajectory parameter value combination set, the trajectory parameter value combination comprising a parameter value of the trajectory parameter in the at least two trajectory parameters;

determining, from the first trajectory parameter value combination set, a plurality of trajectory parameter value combinations for moving from a preset starting position to a preset end position, to obtain a second trajectory parameter value combination set;

determining, in the second trajectory parameter value combination set, a trajectory parameter value combination that satisfies a preset excavation condition, to obtain a third trajectory parameter value combination set;

determining a target excavation trajectory from the third trajectory parameter value combination set, wherein the target excavation trajectory comprises an excavation trajectory indicated by a trajectory parameter value combination having a minimum excavation resistance; and sending a control instruction to the excavator to enable the excavator to excavate material according to the target excavation trajectory, wherein the determining, according to preset value ranges of trajectory parameters in at least two trajectory parameters, a plurality of trajectory parameter value combinations, to obtain a first trajectory parameter value combination set, comprises:

determining, for the trajectory parameter in the at least two trajectory parameters, at least two trajectory parameter values of the trajectory parameter according to the preset value range of the trajectory parameter; and combining trajectory parameter values of the at least two trajectory parameters respectively to obtain the first trajectory parameter value combination set.

\* \* \* \* \*